(12) United States Patent
Hughes

(10) Patent No.: US 11,008,221 B2
(45) Date of Patent: May 18, 2021

(54) POLYFERRIC SULPHATE SOLUTION

(71) Applicant: INDUSTRIAL CHEMICALS GROUP LIMITED, Grays (GB)

(72) Inventor: Christopher Hughes, Grays (GB)

(73) Assignee: INDUSTRIAL CHEMICALS GROUP LIMITED, Grays (GB)

( * ) Notice: Subject to any disclaimer, the term of this patent is extended or adjusted under 35 U.S.C. 154(b) by 0 days.

(21) Appl. No.: 16/756,542

(22) PCT Filed: Oct. 3, 2018

(86) PCT No.: PCT/GB2018/052813
§ 371 (c)(1),
(2) Date: Apr. 16, 2020

(87) PCT Pub. No.: WO2019/077302
PCT Pub. Date: Apr. 25, 2019

(65) Prior Publication Data
US 2021/0009438 A1 Jan. 14, 2021

(30) Foreign Application Priority Data
Oct. 18, 2017 (GB) ...................................... 1717117

(51) Int. Cl.
*C01G 49/14* (2006.01)
(52) U.S. Cl.
CPC .................... *C01G 49/14* (2013.01)
(58) Field of Classification Search
CPC .................................................... C01G 49/14
See application file for complete search history.

(56) References Cited

U.S. PATENT DOCUMENTS

| | | | |
|---|---|---|---|
| 2,196,584 A * | 4/1940 | Edison | C01G 49/14 423/558 |
| 2,252,332 A | 8/1941 | Plummer | |
| 2,306,425 A | 12/1942 | Bevan | |

(Continued)

FOREIGN PATENT DOCUMENTS

| | | |
|---|---|---|
| CN | 107416912 | 12/2017 |
| JP | 2000185921 | 7/2000 |
| JP | 2014070011 | 4/2014 |

OTHER PUBLICATIONS

GB 1717117.4; UK Combined Search and Examination Report under Sections 17 & 18(3) of the Intellectual Property Office of the United Kingdom dated Apr. 4, 2018.

(Continued)

*Primary Examiner* — Anthony J Zimmer
*Assistant Examiner* — Syed T Iqbal
(74) *Attorney, Agent, or Firm* — Renner, Otto, Boisselle & Sklar, LLP

(57) ABSTRACT

A process for production of polyferric sulphate (PFS) solution comprises: a) digesting iron oxide in aqueous sulphuric acid, to form an initial reaction solution including ferrous sulphate; b) subsequently oxidising obtained ferrous ions ($Fe^{2+}$) with nitric acid to convert ferrous ions to ferric ions($Fe^{3+}$); and c) oxidising evolving nitrogen oxides to nitric acid to recover nitric acid; d) wherein the molar ratio of iron to sulphuric acid is such that the obtained PFS product will be sulphate deficient.

16 Claims, 4 Drawing Sheets

(56) References Cited

U.S. PATENT DOCUMENTS

| | | | |
|---|---|---|---|
| 3,954,953 A | 4/1976 | Satterwhite et al. | |
| 4,036,941 A | 7/1977 | Boyles et al. | |
| 4,707,349 A | 11/1987 | Hjersted | |
| 4,814,158 A | 3/1989 | Everill | |
| 5,194,240 A | 3/1993 | Derka | |
| 5,332,565 A | 7/1994 | Derka | |
| 5,624,650 A | 4/1997 | McEwan | |
| 5,766,566 A | 6/1998 | Mattila et al. | |
| 5,785,862 A * | 7/1998 | Graham | C01G 49/14 210/723 |
| 6,375,919 B1 | 4/2002 | Kakio et al. | |
| 7,067,100 B2 | 6/2006 | Faigen et al. | |
| 7,387,770 B2 | 6/2008 | Wilkinson et al. | |
| 8,658,124 B1 * | 2/2014 | Horne | C01G 49/14 423/558 |

OTHER PUBLICATIONS

PCT/GB2018/052813; PCT International Search Report and Written Opinion of the International Searching Authority dated Nov. 29, 2018.

* cited by examiner

POLYFERRIC SULPHATE SOLUTION

This application is a national phase of International Application No. PCT/GB2018/052813 filed Oct. 3, 2018 and published in the English language, which claims priority to GB Patent Application No. 1717117.4 filed Oct. 18, 2017, all of which are hereby incorporated herein by reference in their entireties.

BACKGROUND a. Field of the Invention

The present invention relates to the production of polymeric iron (III) sulphate (polyferric sulphate, PFS) and in particular to the production of preferred polymeric iron (III) sulphate solutions for use in water treatment and water purification facilities. In this specification, iron (III) sulphate refers to an iron salt with the iron in the ferric form, and iron (II) sulphate refers to an iron salt with the iron in the ferrous form or ferrous oxidation state. PFS is a complex ferric material which readily flocculates and has good coagulation.

b. Related Art

It is well known that various hydroxides may be used as coagulating or floc producing agents in water purification and treatment facilities. The floc formed from such agents may be used to trap undissolved materials in the water such as organics, inorganic precipitates, and various biological matters. The floc precipitate generally effectively attracts and absorbs even very fine contaminating particles. During the treatment process, the floc grows in size, and ultimately is removed from the water by settling, skimming or filtering. Such agents may also be used in the treatment of water for the presence of phosphates, and as sludge conditioners in sewage treatment, whereby the sludge is rendered more capable of being filtered and treated.

The better known flocculating agents or floc producing agents are probably ferric hydroxide and aluminium hydroxide. In the past, aluminium hydroxide has often been preferred. However, recently the presence of aluminium hydroxides in treated water has caused some concern as a potential health and/or environmental risk. Thus, more recently, attention has been focusing on the use of ferric hydroxides as water purifying agents.

A well known process for the production of ferric hydroxide, in water treatment facilities, has been by the addition of ferric sulphate to the water to be treated. Generally, the alkaline content of the water rapidly induces hydroxide formation and ultimate floc production, after ferric sulphate is added to the water. If necessary, the pH, or hydrogen ion content of the water, may be adjusted for preferred hydroxide formation.

In the past, numerous problems have resulted from the utilization of ferric sulphate as the hydroxide producing agent. Generally, these can be traced to problems arising during the initial ferric sulphate production, and in the composition of the ferric sulphate agent used, rather than any inherent problem in the use of ferric sulphate itself. For example, ferric sulphate is generally produced from the oxidation of ferrous sulphate. If the oxidation does not go to completion, then some ferrous sulphate may still be present in the water treatment compound. While ferric sulphate is highly soluble in water, and rapidly forms relatively insoluble ferric hydroxide, ferrous sulphate forms ferrous hydroxide, which is somewhat soluble. Thus, in the past, the water being treated may have introduced therein, during the hydroxide forming step, the presence of soluble ferrous hydroxide that is not separated out by the floc. The ferrous hydroxide would then contaminate the treated water.

Further, ferrous sulphate is less soluble in water than is ferric sulphate. The presence of ferrous sulphate in the solutions to be used at water treatment facilities can cause problems, for example by precipitation from solution in the equipment of the plant.

Another problem with ferric sulphate compounds made according to prior processes has been the presence of excess acidity, generally free sulphuric acid, in the ferric sulphate product. Generally, when ferrous sulphate is oxidised, the resulting products are ferric oxide and ferric sulphate. However, if the oxidation takes place in the presence of sulphuric acid, the resulting product is primarily ferric sulphate, with relatively little of the oxide present. Generally, in past productions of ferric sulphate, according to such a general reaction scheme, excess acid would be present in the resulting ferric sulphate product. When such a product has been used in a water treatment facility, it has often been necessary to add alkaline compounds to the water, to adjust the pH of the solution. This not only can be costly, but also the temporary excess acidity, and the length of time taken for neutralization, may inhibit good floc formation. That is, generally, good floc formation has been found to be related to a relatively short period of time for hydroxide formation. If the length of time is increased, floc formation, in water purification, may not be as efficient.

Further, the temporary excess acidity may be harmful to the pipes or machinery in the treatment plant. Also, the addition of alkaline materials to adjust pH may be undesirable under some circumstances.

Conventional methods of forming ferric sulphate generally result in a product which is a slurry, sludge or solid. Such products have, in the past, posed several problems. First, the material may be relatively difficult to handle or dissolve, especially if in the form of a rather solid cake. Further, impurities from the initial iron source may be present in the solid product, resulting in the addition of impurities to the water. Further, such a product may be relatively difficult to handle and package at the site of formation, especially since solid ferric sulphate may be relatively hygroscopic.

Various patents have issued relating to the production of ferric sulphate and PFS. For example, an early patent was U.S. Pat. No. 2,196,584, issued to A. E. Edison on Apr. 9, 1940. This patent describes a process for producing ferric sulphate in which ferrous sulphate is suspended in a sulphuric acid solution to make a slurry containing no substantial excess of water over that required to make the slurry fluid at all times. The ferrous sulphate in the slurry is oxidised with nitric acid. The oxidation occurs at a temperature above about 60° C.

U.S. Pat. No. 2,252,332, issued on Aug. 12, 1941 to J. K. Plummer, shows a process of making ferric sulphate in which iron sulphide ores are roasted in a furnace. The dust from the furnace gases that contain insoluble ferric oxide are collected and mixed with sulphuric acid. Water is added to the mixture. The mixture is stirred without the application of external heat until the reactor is raised to a temperature of approximately 310° F. (154° C.). The heat of reaction is held within the mixture by placing it in a heat-insulated chamber.

U.S. Pat. No. 2,306,425, issued on Dec. 29, 1942 to J. G. Bevan, provides a process for the production of ferric sulphate in which an aqueous solution of ferric sulphate is passed downwardly through a packed tower containing metallic iron so as to reduce the iron of the ferric sulphate and oxidize the metallic iron with the production of a solution of ferric sulphate in the upper portion of the tower. Gases containing sulphur dioxide and oxygen are passed upwardly through the tower in contact with the downwardly flowing solution so as to oxidize the ferrous sulphate and produce a solution in ferric sulphate in a lower portion of the tower.

U.S. Pat. No. 3,954,953, issued on May 4, 1976 to Satterwhite et al., describes an energy-conserving process for the manufacturing of ferric sulphate. At an initial aqueous phase of the process, a low water-containing slurry or dispersion of iron oxide is reacted with only a portion of the total sulphuric acid required in the process to produce a ferric sulphate-containing slurry having unreacted iron oxide. A quantity of acid withheld from the aqueous phase is employed at the time of agglomeration of the ferric sulphate-containing slurry. The delay of the use of the remaining acid to a later step in the process allows the heat of reaction generated in the conversion of the unreacted iron oxide in the slurry to be utilized for completing the reaction and for drying the granules.

U.S. Pat. No. 4,036,941, issued on Jul. 19, 1977 to Boyles et al., shows the preparation of ferric sulphate solutions by a process for recovery of iron from an iron mud. The iron mud contains a mixture of gypsum and ferric hydroxide. The gypsum and the ferric hydroxide mixture is contacted with sulphuric acid of a concentration between 93 and 98 percent for a period of one to twelve hours. The undissolved material is removed and recovered as a 25 to 50 percent ferric sulphate solution.

U.S. Pat. No. 4,707,349, issued on Nov. 17, 1987 to N. B. Hjersted, provides a process of preparing a preferred ferric sulphate solution and product. Iron oxides or iron are dissolved in sulphuric acid to form ferrous sulphate. The ferrous sulphate is partially oxidised to ferric sulphate in the presence of dissolved oxygen. In a second stage of oxidation, the remaining ferrous sulphate is oxidised to ferric sulphate by the action of a non-molecular oxygen-oxidising agent, such as hydrogen peroxide.

During both stages of oxidation, a catalyst, such as copper sulphate or copper ammonium sulphate, is used.

U.S. Pat. No. 4,814,158, issued on Mar. 21, 1989 to N. R. Everill, describes a process for making liquid ferric sulphate from finely-divided ferric oxide, sulphuric acid and water. This is carried out in a closed reaction vessel at temperatures ranging from about 130° C. to about 150° C. and at pressures from about 30 p.s.i. to about 40 p.s.i. The reaction time ranges from four to eight hours.

U.S. Pat. No. 5,766,566, issued on Jun. 16, 1998 to Mattila et al., provides a process for preparing ferric sulphate by forming a slurry which contains ferrous sulphate and sulphuric acid. The slurry contains bivalent iron in both the solution phase and the solid phase. The slurry is oxidised to form a ferric sulphate slurry. The ferric sulphate slurry is solidified to form solid ferric sulphate.

U.S. Pat. No. 5,785,862, issued on Jul. 28, 1998 to Graham and Jiang teaches the method of preparing PFS solution by oxidation of ferrous sulphate to ferric sulphate with subsequent partial hydrolysis by adding at least one base to the obtained ferric sulphate solution. The ferric sulphate is kept in contact with the base at the temperature selected for a time sufficient for polymerization of the at least partially hydrolysed ferric sulphate.

U.S. Pat. No. 6,375,919, issued on Apr. 23, 2002 to Kakio et al., teaches a method for the manufacture of ferric sulphate solution and a water treatment agent using the same. Iron ore containing 30 percent of FeOOH as a trivalent iron is calcined at 200-600° C. and then dissolved in sulphuric acid.

U.S. Pat. No. 7,067,100, issued on Jun. 27, 2006 to Faigen et al., describes a liquid ferric sulphate manufacturing process. This liquid ferric sulphate is produced from finely-divided ferric oxide, sulphuric acid and water in a closed reaction vessel at temperatures ranging from about 130° C. to about 150° C. and pressures from about 30 p.s.i. to about 70 p.s.i. The reaction time ranges from four to eight hours and produces liquid ferric sulphate having at least 10 percent trivalent iron.

U.S. Pat. No. 7,387,770, issued on Jun. 17, 2008 to Wilkinson et al., shows a process similar to that of U.S. Pat. No. 7,067,100.

U.S. Pat. No. 5,194,240, issued on Mar. 16, 1993 to J. R. Derka, provides the process of the manufacture of ferric sulphate from ferrous sulphate in a closed circuit or vessel having a liquid phase and a vapour phase. The vapour phase is a closed system. The process provides oxidation between about 70° C. to about 150° C. of the iron under pressure utilising oxygen in the closed circuit and NOx as a catalyst.

U.S. Pat. No. 5,332,565, issued on Jul. 26, 1994 to J. R. Derka, shows a similar process as that of U.S. Pat. No. 5,194,240, U.S. Pat. No. 5,624,650, issued on Apr. 29, 1997 to McEwan et al., shows a nitric acid process for ferric sulphate production. Ferric sulphate is produced by treating ferric ammonium sulphate, ammonium jarosite, or a similar iron complex with nitric acid. The ferric ammonium sulphate or ammonium jarosite can be formed by treating a sulphuric acid leaching solution with a solution of ammonium nitrate. Upon addition of dilute nitric acid at a temperature of about 60° C., ferric sulphate forms and is recovered.

U.S. Pat. No. 8,658,124, issued on Feb. 25, 2014 to R. L. Horne shows a process for manufacturing ferric sulphate that has the steps of introducing water into an interior of a pressure vessel, introducing an iron material into the interior of the pressure vessel, mixing the iron material and the water within the interior of the pressure vessel, adding sulphuric acid to the mixed iron material and water, agitating the iron material and the sulphuric acid and the water for a period of time so as to increase a temperature of a reaction and a pressure of the reaction within the interior of the pressure vessel, and discharging ferric sulphate from the interior of the pressure vessel. The iron material can be either hematite or magnetite. Oxygen can be introduced into the interior of the pressure vessel if the iron material is magnetite.

Mill scale is the flaky surface of hot rolled steel, consisting of the iron oxides iron(II) oxide (FeO), iron(III) oxide ($Fe_2O_3$), and iron(II,III) oxide ($Fe_3O_4$, magnetite). Mill scale is formed on the outer surfaces of plates, sheets or profiles when they are being produced by rolling red hot iron or steel billets in rolling mills. Mill scale is bluish black in colour. It is usually less than 0.1 mm (0.0039 in) thick and initially adheres to the steel surface and protects it from atmospheric corrosion provided no break occurs in this coating.

Because it is electrochemically cathodic to steel, any break in the mill scale coating will cause accelerated corrosion of steel exposed at the break. Mill scale is thus a boon for a while until its coating breaks due to handling of the steel product or due to any other mechanical cause.

Mill scale is a nuisance when the steel is to be processed. Thus mill scale can be removed from steel surfaces by flame cleaning, blasting or pickling.

A circular economy is an alternative to a traditional linear economy (make, use, dispose) in which resources are kept in use for as long as possible, the maximum value is extracted from them whilst in use, then products and materials at the end of each service life are recovered and regenerated.

It is an object of the present invention to provide a method for manufacturing polymeric ferric sulphate solution (PFS) in which mill scale/magnetite (by-products of rolling mills process) may be used as the feedstock and in which nitric acid used for oxidation is regenerated.

It is another object of the present invention to provide a process for the production of polymeric ferric sulphate in which the PFS is produced economically and optimally.

It is another object of the present invention to provide a process for the production of PFS that allows PFS to be produced without introduction of oxygen.

It is still a further object of the present invention to provide a process for the manufacture of PFS that reduces the time for digestion.

It is still a further object of the present invention to provide a process for the manufacture of PFS that does not require a separate hydrolysis stage.

It is still another object of the present invention to provide a process for the manufacture of PFS which allows the process to be carried out in a single vessel without the need for separate vessels for digestion and oxidation.

These and other objects and advantages of the present invention will become apparent from a reading of the attached specification and appended claims.

SUMMARY OF THE INVENTION

According to the present invention there is provided a process for production of polyferric sulphate (PFS) solution comprising:
 a) digesting iron oxide in aqueous sulphuric acid to form an initial reaction solution including ferrous sulphate;
 b) subsequently oxidising obtained ferrous ions ($Fe^{2+}$) with nitric acid to convert ferrous ions to ferric ions ($Fe^{3+}$); and
 c) oxidising evolving nitrogen oxides to nitric acid to recover nitric acid;
 d) wherein the molar ratio of iron to sulphuric acid is such that the obtained PFS product will be sulphate deficient.

We have surprisingly found that the ferrous ion is catalysing the digestion of iron oxide, notably mill scale and/or magnetite, in sulphuric acid and the reaction is thus somewhat autocatalytic. So the addition of the oxidising nitric acid is deferred, preferably until the concentration of ferrous sulphate in the reaction mixture has reached a predetermined value, for example 7-11% mass, notably 9-10% mass.

The iron oxide feedstock may be mill scale, magnetite ($Fe_3O_4$), or mixtures thereof, optionally admixed with hematite ($Fe2O3$).

The mixture of the feedstock and sulphuric acid is digested over a period of time. The process temperature may be in the range 60-115° C., preferably in the range 80° C. to 110° C. Then nitric acid, preferably having a concentration in the range 25-35% mass, is added to the reactor to oxidise ferrous ions to ferric ions. The nitric acid may be added when the concentration of ferrous ions reaches 7-11% mass, preferably 9-10% mass.

The evolving NOx may be passed through a system of scrubbers where it is oxidised to nitric acid, preferably by aerated water and/or aqueous hydrogen peroxide. The NOx oxidation is preferably carried out at a temperature in the range 35-90° C. At least some of the nitric acid used for the oxidation of ferrous sulphate may be recovered from the process of NOx oxidation.

The reaction temperature may be maintained mainly due to sulphuric acid dilution heat, iron oxides dissolution heat and ferrous sulphate oxidation heat. If necessary, additional external heating may be provided to maintain temperature within the preferred range.

Sulphuric acid necessary for the digestion of the feedstock is added in such a ratio that the finished ferric sulphate solution has a sulphate deficiency. Undigested iron oxide may be removed by filtration and used in a subsequent reaction, so the amount of the excess is not critical. For greater efficiency it is preferred that the molar excess of iron is equivalent to up to 5% free acid in the finished product, preferably 1-5%, notably 3-5%. The terms "acid deficient", "sulphate deficient" and the like are used herein to mean that the molar ratio of sulphuric acid to iron is less than required to convert all iron to ferric sulphate. We can define acid deficiency or sulphate deficiency as the amount of sulphuric acid needed for an acid neutral batch minus the acid added as a percentage of the acid neutral batch. For example, if a given batch required 100 kg of 100% sulphuric acid for conversion of all iron to ferric sulphate, addition of between 97 to 95 kg of 100% sulphuric acid would be acid deficient or sulphate deficient by 3-5%.

We have found that by adding an excess of the iron oxide we get a faster dissolution time to achieve the amount of iron in solution.

Preferably, the aqueous sulphuric acid has a concentration in the range 45-60% mass.

The molar ratio of iron to sulphuric acid is preferably such that the obtained product will be sulphate deficient by 0.1 to 5%, preferably 0.1 to 3%. It is particularly preferred that the molar ratio of iron to sulphuric acid is such that the obtained product will be sulphate deficient by 0.1 to 1%

We have surprisingly found that no nitrate is present in the finished product. Nitric acid provides the oxidation step but is recovered in the scrubber chain for reuse. Without wishing to be bound by theory, we believe that the balance of ferric in the sulphate-deficient product is present as one or more hydroxylsulphates.

PFS produced by prior art processes is strongly acidic. When used in water treatment post-coagulation, it requires a base to be added, typically CaO, $Ca(OH)_2$ or NaOH. This adds to cost and complexity at the water treatment plant. The product of the present process requires much less or no base to be added for pH correction, so providing a cost saving.

It is recognised that PFS is always liable to contain a small concentration of ferrous ion. Preferably essentially all ferrous ions are oxidised to ferric ions. The ratio of ferric ions to ferrous ions in the final product may be at least 50:1, preferably at least 60:1. Retaining a small amount of $Fe^{2+}$ provides a safeguard to ensure that no nitric acid remains. Potentially if free nitric acid were present, NOx could be formed on storage, with adverse consequences.

BRIEF DESCRIPTION OF THE DRAWINGS

The invention will now be further described, by way of example only, with reference to the following drawings in which.

DETAILED DESCRIPTION

Figure 1:
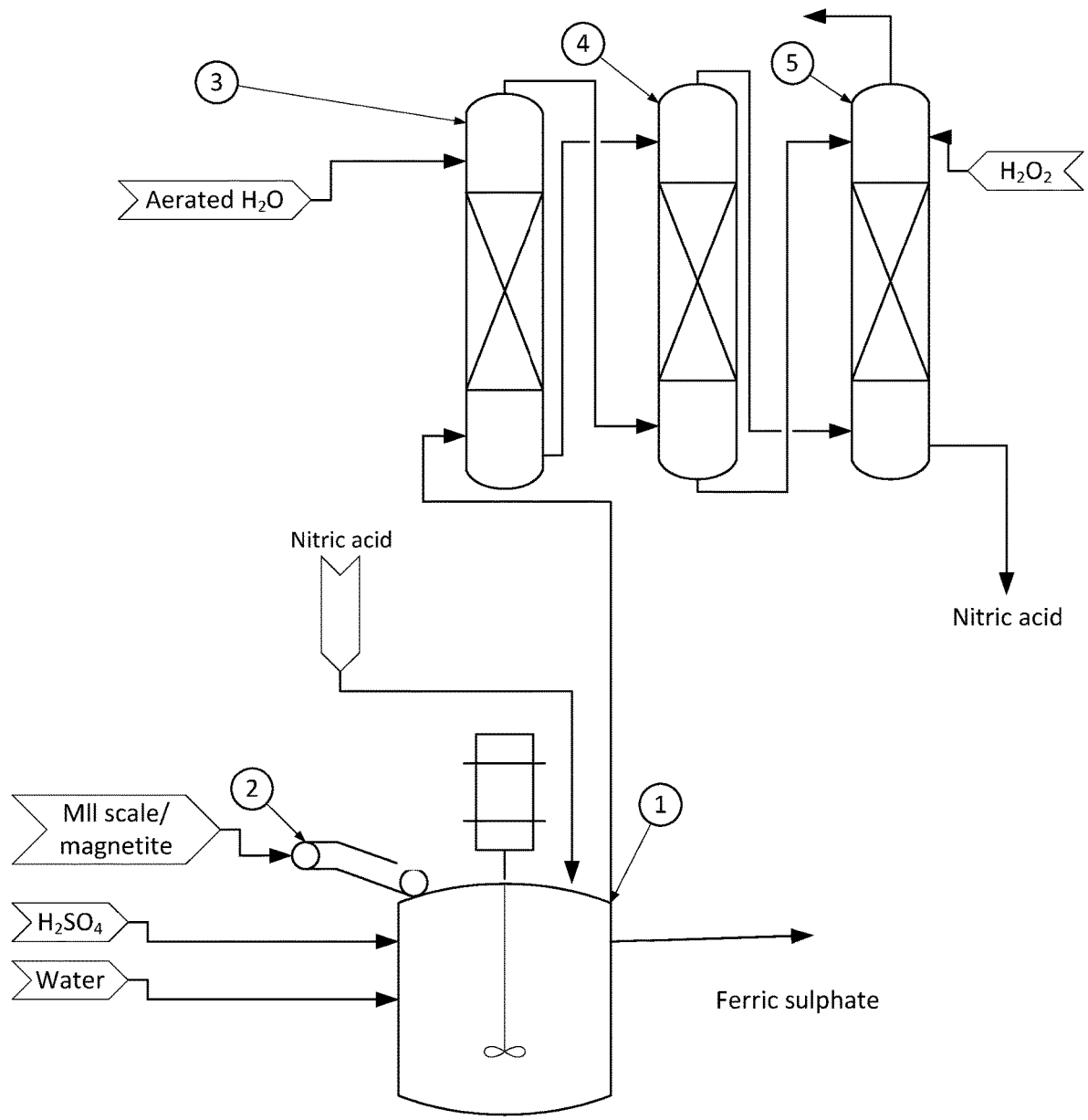
FIG. 1 is a diagrammatic illustration of a process for the manufacture of poly ferric sulphate in accordance with an embodiment of the present invention.

Referring to FIG. 1 there is shown a process for the production of PFS solution in accordance with an embodiment of the present invention. Water is loaded into the reactor 1, then 98% sulphuric acid is added in such a ratio that the final concentration of diluted sulphuric acid is in the range of 45-60% mass. Then mill scale/magnetite is added in a near-stoichiometric amount over 4-5 hours.

After the concentration of ferrous iron reaches 8-10% a near-stoichiometric amount of nitric acid is added to the reactor. The reaction initially produces nitric oxide (NO):

$$3\ Fe^{2+}+4H^{+}+NO_3^{-}\rightarrow 3\ Fe^{3+}+2H_2O+NO\uparrow$$

The nitric oxide subsequently oxidises to nitrogen dioxide, and the evolving NOx is captured and oxidised to nitric acid in a three-stage scrubber, where a 35-50% aqueous solution of hydrogen peroxide is circulated.

The obtained finished PFS with $Fe^{3+}$ concentration (8.5-12.8%), $Fe^{2+}$ concentration (0.1-0.3%) and free acid (−3.5 to −0.1%) may be stored in the reactor tank and supplied to customers.

Examples of the process in accordance with the invention which follow are for the purpose of demonstrating specific processes in accordance with the invention and are not intended to be limiting in scope on the invention or claims. The following examples are exemplary syntheses of numerous actual runs.

Comparative Example 1.

Figure 2:
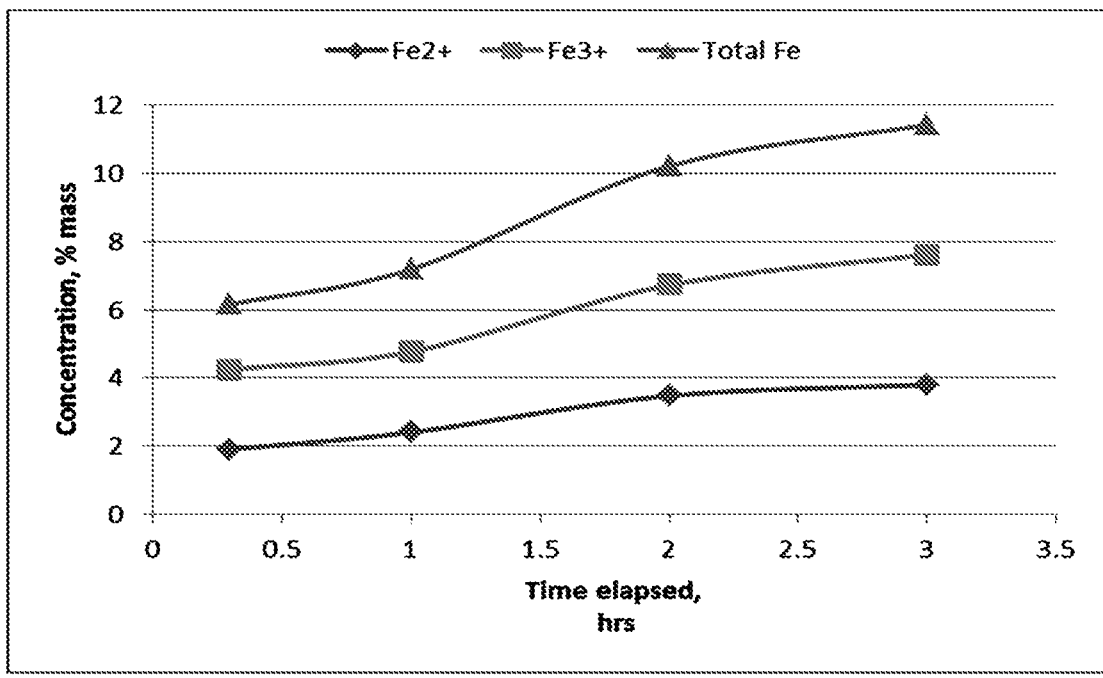
FIGS. 2 and 3 are graphs of concentration against elapsed time for comparative experiments not in accordance with the present invention.

To a stirred 500 ml beaker are charged 132 ml water, 72 ml concentrated sulphuric acid (98%), and 69 g of magnetite. The reaction is carried out for 3 hours at 80° C. The results are shown in FIG. 2.

Comparative Example 2.

Figure 3:
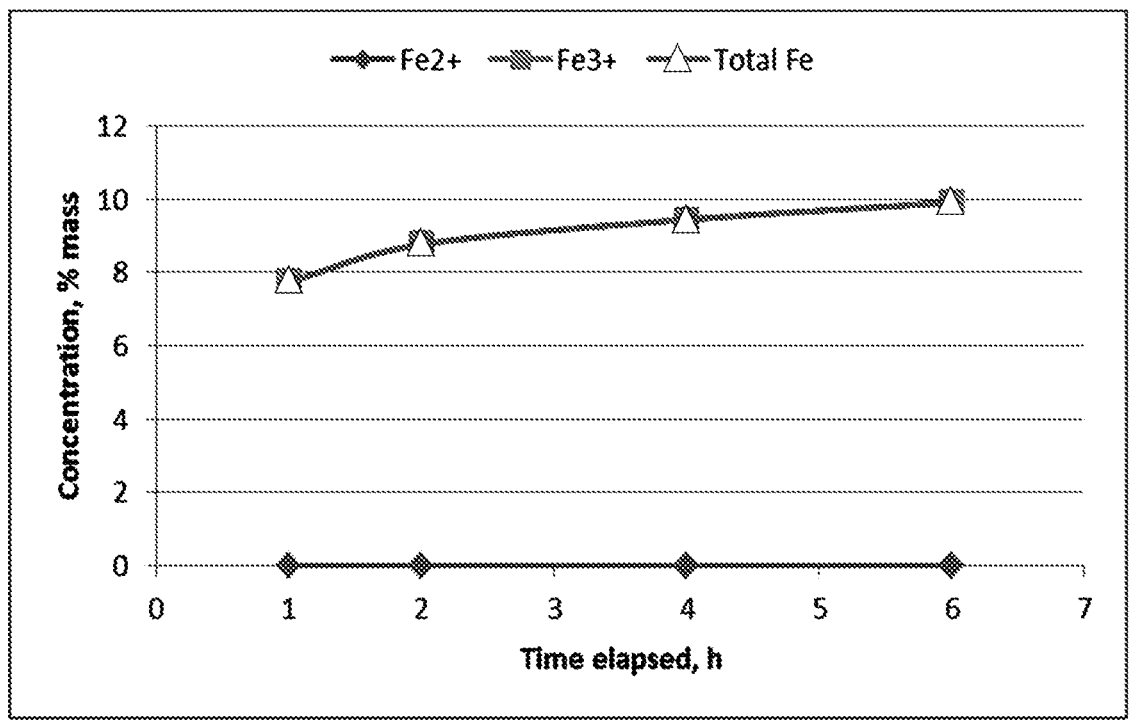

To a stirred 1000 ml beaker are charged 192 ml water, 83 ml of concentrated sulphuric acid (98%), 30 ml of 30% nitric acid and 96.5 g of mill scale, and the mixture is stirred at 100-110 ° C. The results are shown in a FIG. 3.

It is seen from the results above that in the absence of ferrous ion, resulting from oxidation by the nitric acid in Example 2, the digestion of iron oxides in sulphuric acid proceeds much slower even at temperatures that are significantly higher than in the Example 1.

The Examples 3 and 4 show the results of full scale plant trials in accordance with embodiments of the invention.

Examples 3 and 4.

A stirred tank 80 m³ volume was charged with 13,200 kg of 98% sulphuric acid, 19,600 kg of water and 6,900 kg of magnetite was added over 2-3 hours. The digestion continued for up to 5 hours at 85-110° C., and 1870 kg of 31.5% $HNO_3$ was added. The reactor was constantly flashed with air at a rate of 1000-1200 m³/h and 675 kg of evolved $NO_x$ were oxidised to nitric acid. In order to prevent loss of heat, the reactor when necessary was fed up to 2300 kg/h of 7 barg steam. The reaction temperature for Example 3 was about 80° C., and for Example 4 was about 100° C.

Free sulphuric acid content of the final product was determined by titration based on EN 890: 2004. Details are summarised below.

1.00 PURPOSE AND SCOPE

This procedure describes the method for determining the free acid content of all grades of Ferric Sulphate solution.

2.00 DEFINITIONS

None.

3.00 REFERENCES

| | |
|---|---|
| EN 890: 2004 | Chemical used for treatment of water intended for human consumption - Iron (III) sulphate liquid, Annex B.4 Determination of free acid |

3.01 Supporting Documents
None 4.00 PROCEDURE

Principle 4.01 An excess of Sulphuric Acid is accurately added, to the test solution. Fluoride ions are added in excess which form a strong complex with $Fe^{3+}$ ions in the sample, thereby removing their acidic properties. The concentration of Hydrogen ions (from the added sulphuric acid plus that present in samples as free acid/less that reacted with samples that are sulphate/acid deficient) is determined by titration against Sodium Hydroxide, using Phenolphthalein as an indicator.

Reagents
4.02

| | |
|---|---|
| 0.200M Sodium Hydroxide | e.g. Fisher Catalogue No. J/7640 |
| 0.100M Sulphuric Acid (0.2N) | e.g. Fisher Catalogue No. J/8450 |
| Phenolphthalein indicator solution, 1% | e.g. Fisher Catalogue No. P/2401L/08 |
| Potassium Fluoride Solution, 200 g/l | Dissolve 310 g of KF•2H₂O in 1000 ml of water. Adjust to pH 9.1 (the colour change of Phenolphthalein) by adding Sodium Hydroxide or Sulphuric Acid as appropriate (Add phenolphthalein indicator and titrate in just enough NaOH or H₂SO₄ as appropriate to cause the colour of the solution to change). Caution Potassium Fluoride is toxic. Wear rubber gloves |

Method 4.03 1. Tare a 250 ml volumetric flask, and weigh in approximately 20 g of sample. Record the sample mass taken (W). Dilute the sample to the mark with water and mix.*

2. Pipette 10.0 ml of the dilute solution into a 500 ml Erlenmeyer flask (using a one mark pipette).* Add 25.0 ml of 0.100 M (0.2N) Sulphuric Acid (using a one mark pipette). Also add approximately 30 ml of water.

3. In a separate Erlenmeyer flask, add 20 ml of 200g/l KF solution, 50 ml of water, three drops of Phenolphthalein indicator, and 5 ml of 0.100M (0.2N) Sulphuric Acid. Titrate in 0.200M (0.2N) Sodium Hydroxide until the indicator just changes colour (to faint pink).

Note that this step is specified to ensure that the Potassium Fluoride used in each test is neutral to the perception of the person performing the test. Experience has shown that between operator variance is reduced significantly in this way.

4. Pour the neutralised KF solution into the sample flask (from steps 2 and 3). Add three more drops of Phenolphthalein indicator, and titrate to the Phenolphthalein colour change. Record the titre, T.

Calculation 4.04

$$\%H_2SO_4 = \frac{(T-25) \times 24.5175^*}{W}$$

*Note that if a balance with sufficient precision (4 decimal place) is available the sample dilution stage of the test may be omitted by accurately weighing approximately 2.0 g of sample into the 500 ml Erlenmeyer the flask. The test will then continue from partway through step 2: i.e. Add 25.0 ml of 0.100M (0.2N) Sulphuric Acid (using a one mark pipette) . . . If using this method, 40 ml of KF solution should be used instead of 20 ml.

Without the dilution to 250 ml and pipetting 10 ml, the calculation becomes:

$$\%H_2SO_4 = \frac{(T-25) \times 0.9807}{W}$$

Figure 4:
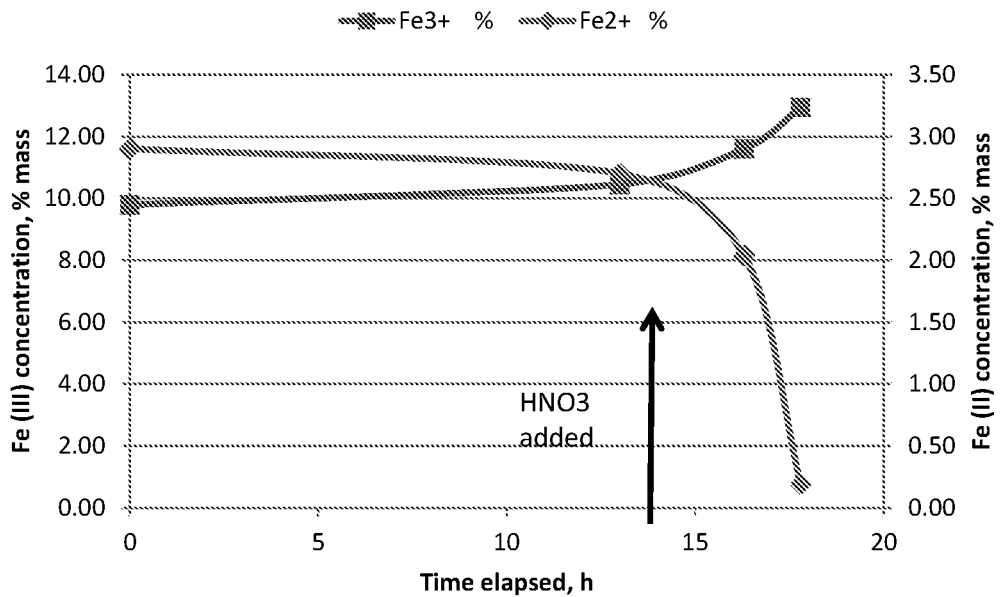
FIGS. 4 to 7 are graphs of concentration against elapsed time for processes in accordance with embodiments of the present invention.
Figure 5:
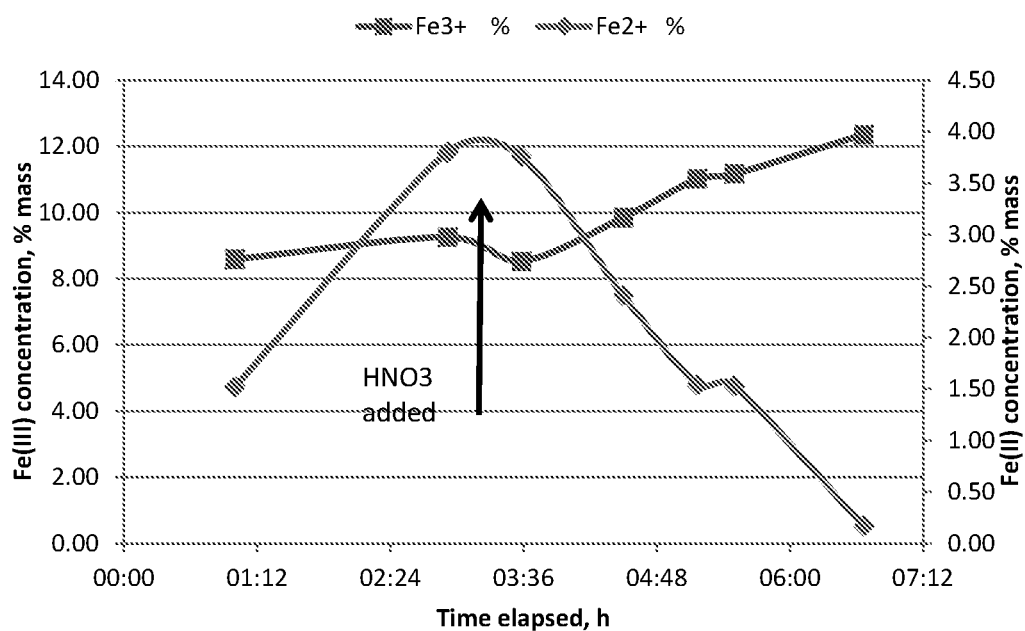

The results are shown in FIGS. 4 and 5 respectively. The run in Example 3 produced about 40,000 kg of PFS solution with 12.8% concentration of $Fe^{3+}$, 0.19% concentration of $Fe^{2+}$ and −0.34% mass concentration of free acid.

The run in Example 4 produced about 40,000 kg of PFS solution with 12.36% concentration of $Fe^{3+}$, 0.17% concentration of $Fe^{2+}$ and −0.37% mass concentration of free acid.

Comparative Example 5

A stirred vessel was charged with 183 g of water and 133.9 g of 98% sulphuric acid. Magnetite (69 g) was added, and the reaction mixture was maintained at 80-90° C. After 2 hours 15 ml 30% nitric acid was added. The obtained product had 9.4% concentration of $Fe^{3+}$, 0.11% concentration of $Fe^{2+}$ and −0.02% concentration of free acid.

Comparative Example 6

A stirred vessel was charged with 183 g of water and, 127 g of 98% sulphuric acid. Magnetite (69 g) was added, and the reaction mixture was maintained heated at 80-90° C. After 4 hours 15 ml 30% nitric acid was added. The obtained product had 12.3% concentration of $Fe^{3+}$, 0.21% concentration of $Fe^{2+}$ and −4.99% concentration of free acid.

Figure 6:
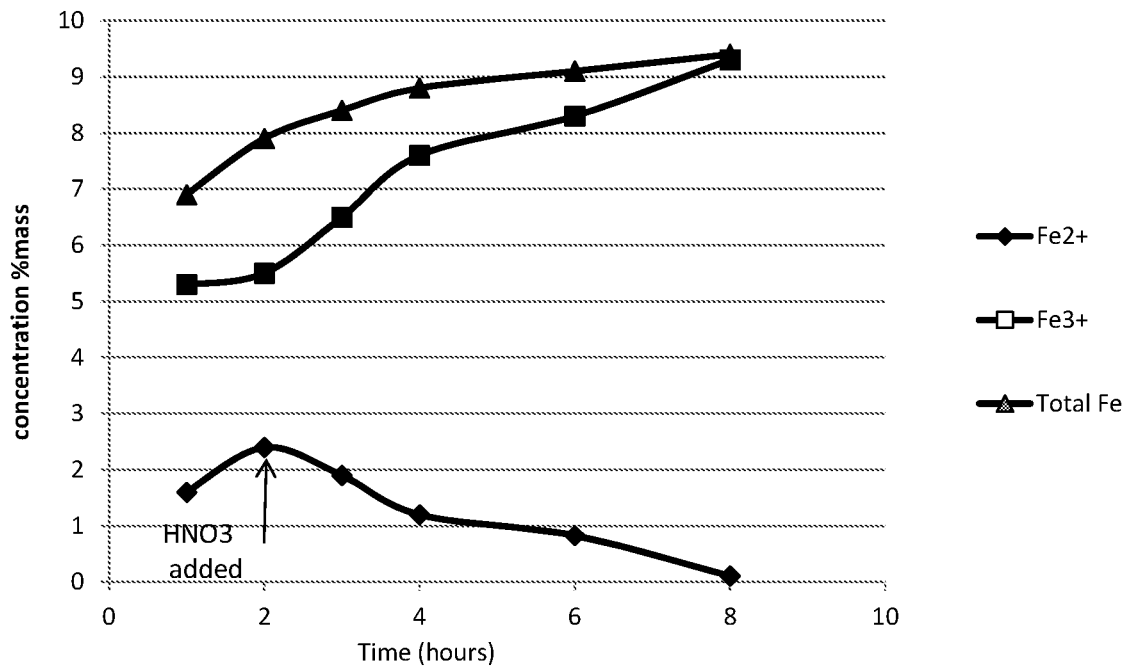
Figure 7:
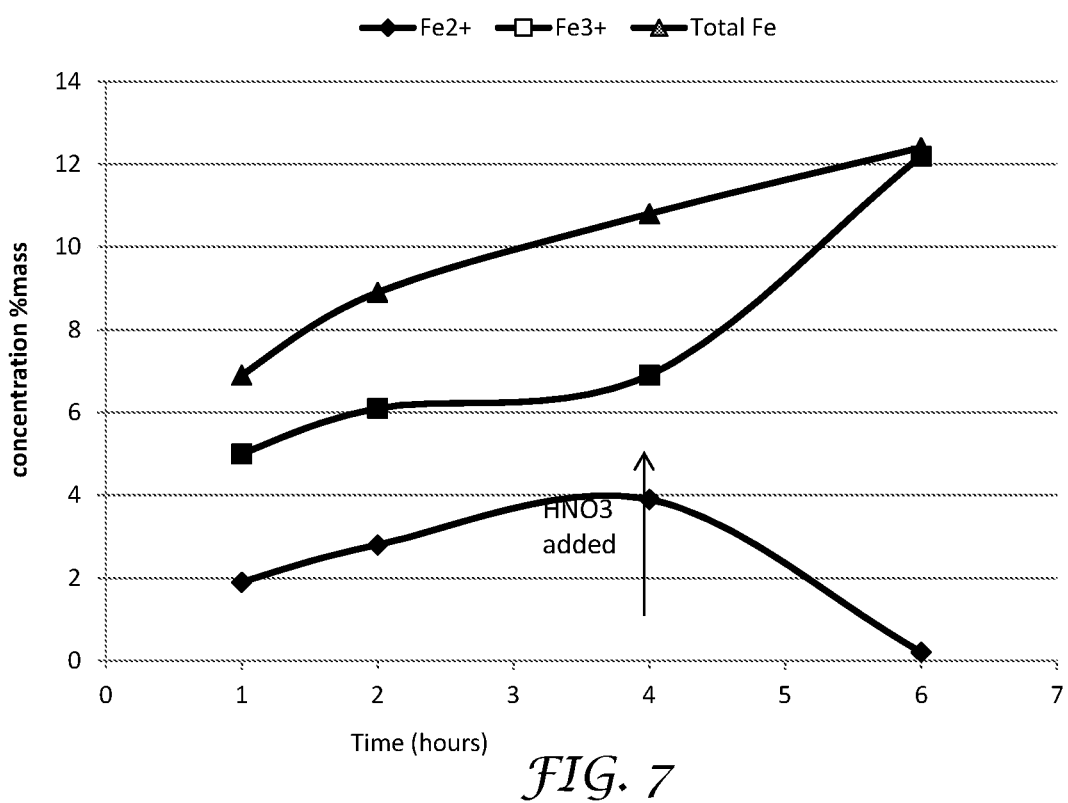

Results are shown in FIGS. 6 and 7 respectively. Later addition of nitric acid (Example 6) resulted in a higher concentration of ferric in the product than earlier addition (Example 5).

The foregoing describes exemplary embodiments of the present invention. It is understood that modifications to these embodiments can be made within the scope of the present invention. As such, the examples should not to be construed, in any way, as limiting of the scope of the present invention. The present invention should only be limited by the following claims.

The invention claimed is:

1. A process for production of polyferric sulphate (PFS) solution comprising:
   digesting iron oxide in aqueous sulphuric acid, to form an initial reaction solution including ferrous sulphate having ferrous ions ($Fe^{2+}$);
   subsequently oxidising the ferrous ions ($Fe^{2+}$) with nitric acid to convert the ferrous ions to ferric ions ($Fe^{3+}$) to produce the PFS solution and evolving nitrogen oxides; and
   oxidising the evolving nitrogen oxides to nitric acid to recover nitric acid;
   wherein the molar ratio of iron to sulphuric acid is such that the PFS solution produced in the process is sulphate deficient by 0.1% to 1%.

2. The process according to claim 1, wherein the iron oxide is selected from the group consisting of mill scale, magnetite, and mixtures thereof.

3. The process according to claim 1, wherein the aqueous sulphuric acid has a concentration in the range 45-60% mass.

4. The process according to claim 1, wherein the digestion is carried out at a temperature in the range 60° C.-115° C.

5. The process according to claim 4, wherein the digestion is carried out at a temperature in the range 80° C.-110° C.

6. The process according to claim 1, wherein the addition of nitric acid is started when the concentration of $Fe^{2+}$ reaches 7-11% mass.

7. The process according to claim 6, wherein the addition of nitric acid is started when the concentration of $Fe^{2+}$ reaches 9-10% mass.

8. The process according to claim 1, wherein the evolving NOx is oxidised by aerated water and/or aqueous hydrogen peroxide.

9. The process according to claim 1, wherein at least some of the nitric acid used for the oxidation of ferrous sulphate is recovered from the process of NOx oxidation.

10. The process according to claim 1, wherein the NOx oxidation is carried out at a temperature in the range 35-90° C.

11. The process according to claim 1, wherein the concentration of the added nitric acid is in the range 25-35% mass.

12. The process according to claim 1, wherein the ratio of $Fe^{3+}$ to $Fe^{2+}$ in the product is at least 50:1.

13. The process according to claim 1, wherein essentially all $Fe^{2+}$ is oxidised to $Fe^{3+}$.

14. The process according to claim 2, wherein the iron oxide is admixed with hematite.

15. The process according to claim 1, wherein the molar ratio of iron to sulphuric acid is such that the obtained product will be sulphate deficient by 0.1 to 3%.

16. The process according to claim 1, wherein the ratio of $Fe^{3+}$ to $Fe^{2+}$ in the product is at least 60:1.

* * * * *